United States Patent
Lu et al.

(10) Patent No.: US 10,591,688 B2
(45) Date of Patent: Mar. 17, 2020

(54) OPTICAL DEVICE PACKAGE

(71) Applicant: Advanced Semiconductor Engineering, Inc., Kaohsiung (TW)

(72) Inventors: Mei-Ju Lu, Kaohsiung (TW); Tai-Hsuan Tu, Kaohsiung (TW); Yi-Min Chin, Kaohsiung (TW); Wei Lun Wang, Kaohsiung (TW); Jia-Hao Zhang, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 0 days.

(21) Appl. No.: 16/298,989

(22) Filed: Mar. 11, 2019

(65) Prior Publication Data

US 2019/0204514 A1  Jul. 4, 2019

Related U.S. Application Data

(62) Division of application No. 15/615,390, filed on Jun. 6, 2017, now Pat. No. 10,268,002.

(51) Int. Cl.
*G02B 6/42* (2006.01)
*G02B 6/30* (2006.01)
*G02B 6/255* (2006.01)

(52) U.S. Cl.
CPC ......... *G02B 6/4214* (2013.01); *G02B 6/2552* (2013.01); *G02B 6/305* (2013.01); *G02B 6/4204* (2013.01); *G02B 6/4201* (2013.01)

(58) Field of Classification Search
None
See application file for complete search history.

(56) References Cited

U.S. PATENT DOCUMENTS

| | | | |
|---|---|---|---|
| 6,310,995 B1 * | 10/2001 | Saini | B82Y 20/00 385/28 |
| 7,288,794 B2 | 10/2007 | Marsh et al. | |
| 8,326,100 B2 | 12/2012 | Chen et al. | |
| 8,891,921 B2 | 11/2014 | Sakai et al. | |
| 8,965,153 B2 * | 2/2015 | Takahashi | G02B 6/1228 257/E33.067 |
| 2003/0223719 A1 | 12/2003 | Salib | |
| 2014/0347073 A1 | 11/2014 | Brown | |
| 2017/0115212 A1 | 4/2017 | Brown | |

OTHER PUBLICATIONS

Ahmadi, Leila et al., "Hybrid layered polymer slot waveguide Young interferometer", Optics Express, vol. 24, No. 10, May 2016, pp. 10275-10285.

(Continued)

*Primary Examiner* — Tina M Wong
(74) *Attorney, Agent, or Firm* — Foley & Lardner LLP

(57) ABSTRACT

An optical device package includes: (1) a waveguide, the waveguide including: a main body; and multiple forks, wherein each of the plurality of forks has a tapering end and is extended from the main body, and wherein each of the tapering ends of the forks includes a facet for receiving light; and (2) an optical fiber having a surface configured to output the light into the waveguide; wherein a lateral distance between the surface of the optical fiber and at least one of the facets is less than about 25 micrometers (μm).

17 Claims, 6 Drawing Sheets

(56) References Cited

OTHER PUBLICATIONS

Wang, Jing et al., "A silicon-on-insulator polarization diversity scheme in the mid-infrared", Optics Express, vol. 23, No. 11, Jun. 2015, pp. 15029-15037.
Non-Final Office Action for U.S. Appl. No. 15/615,390 dated May 30, 2018, 11 pages.
Notice of Allowance for U.S. Appl. No. 15/615,390 dated Dec. 11, 2018, 5 pages.

* cited by examiner

| Gap | CE | arc | θ |
|---|---|---|---|
| 0.00 | 0.424916 | 0 | 0 |
| 0.50 | 0.47684 | 0.002778 | 0.159155 |
| 1.00 | 0.566115 | 0.005555 | 0.318307 |
| 1.25 | 0.597436 | 0.006944 | 0.397881 |
| 1.50 | 0.629924 | 0.008333 | 0.477454 |
| 1.75 | 0.616621 | 0.009722 | 0.557025 |
| 2.00 | 0.597448 | 0.011111 | 0.636594 |
| 2.50 | 0.519388 | 0.013888 | 0.795724 |
| 3.00 | 0.44376 | 0.016665 | 0.954841 |

OPTICAL DEVICE PACKAGE

CROSS-REFERENCE TO RELATED APPLICATIONS

This application is a divisional of U.S. patent application Ser. No. 15/615,390, filed Jun. 6, 2017, the contents of which are incorporated herein by reference in their entirety.

BACKGROUND

1. Technical Field

The present disclosure relates to an optical device package. In particular, the present disclosure relates to an optical device package including a fork-type optical waveguide.

2. Description of the Related Art

In some optical devices, light is transmitted from a waveguide to an optical fiber (or vice versa). However, the mismatch between diameters and widths of the waveguide and the optical fiber reduces optical coupling efficiency and increases optical coupling loss.

A manufacturing process to address such problem may include tapering a receiving end of the waveguide. However, there is still a high optical coupling loss around the interface between the waveguide and the optical fiber even with the tapering. Another approach to address the problem may use materials of different refractive indices. However, the cost of such a manufacturing process is high and the process is complicated.

SUMMARY

In some embodiments, an optical device package includes: (1) a waveguide, the waveguide including: a main body; and multiple forks, wherein each of the plurality of forks has a tapering end and is extended from the main body, and wherein each of the tapering ends of the forks includes a facet for receiving light; and (2) an optical fiber having a surface configured to output the light into the waveguide; wherein a lateral distance between the surface of the optical fiber and at least one of the facets is less than about 25 micrometers ($\mu$m).

In some embodiments, an optical device includes: (1) a waveguide, the waveguide including: a main body; and multiple forks extended from the main body, each fork including a tapering end, wherein each of the tapering ends of the forks includes a facet for receiving light, wherein the forks are configured to propagate light beams that form constructive interference in the main body; and (2) an optical fiber having a surface configured to output the light into the waveguide; wherein a lateral distance between the surface of the optical fiber and at least one of the facets is less than about 25 $\mu$m.

In some embodiments, an optical device package includes: (1) a waveguide, the waveguide including: a main body; and an extension portion, wherein the extension portion has an end extending around a circumference of the extension portion, and the extension portion tapers from the end towards the main body; and (2) an optical fiber having a surface configured to output light into the waveguide; wherein a lateral distance between the surface of the optical fiber and the end is less than about 25 $\mu$m.

BRIEF DESCRIPTION OF THE DRAWINGS

Aspects of some embodiments of the present disclosure are best understood from the following detailed description when read with the accompanying figures. It is noted that various structures may not be drawn to scale, and dimensions of the various structures may be arbitrarily increased or reduced for clarity of discussion.

Common reference numerals are used throughout the drawings and the detailed description to indicate the same or similar elements. Embodiments of the present disclosure will be more apparent from the following detailed description taken in conjunction with the accompanying drawings.

DETAILED DESCRIPTION

At least some embodiments of the present disclosure describe optical device packages having improved quality of light transmission. Moreover, according to some embodiments, the optical device package may increase the optical coupling efficiency of the package because at least some of the light beams propagating in forks of the package form constructive interference.

Spatial descriptions, such as "above," "below," "up," "left," "right," "down," "top," "bottom," "vertical," "horizontal," "side," "higher," "lower," "upper," "over," "under," and so forth are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such arrangement.

Figure 1:
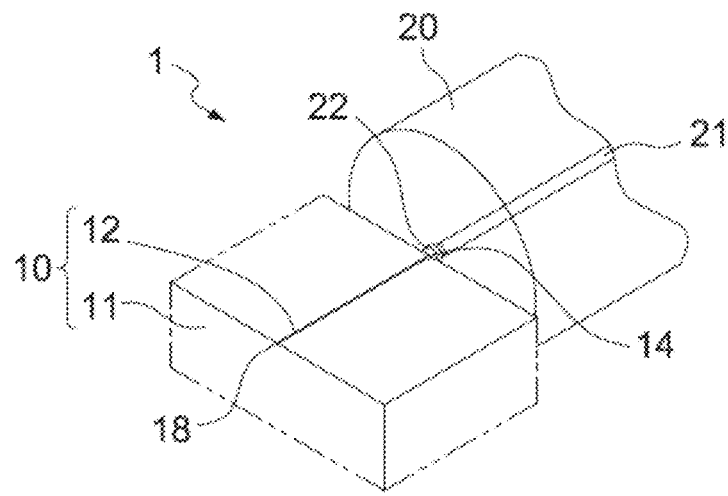
FIG. 1 illustrates a perspective view of an optical device package in accordance with some embodiments of the present disclosure.

FIG. 1 illustrates a perspective view of an optical device package 1 in accordance with some embodiments of the present disclosure. The optical device package 1 may include two optical devices 10 and 20. The optical device 10 may be, e.g., a waveguide (or a portion of a waveguide). The optical device 20 may be, e.g., an optical fiber (or a portion of an optical fiber). The optical device 10 includes an oxide layer 11 and a light transmission layer 12. The light transmission layer 12 includes a facet 14 for receiving light. The optical device 20 includes a light transmission element 21 and a surface 22. The light transmission element 21 may be, e.g., a fiber core. The optical device 10 may be optically coupled to the optical device 20. The surface 22 of the optical device 20 may be used for outputting the light to the optical device 10.

The oxide layer 11 includes a material of a first refractive index. The light transmission layer 12 may be, e.g., surrounded by the oxide layer 11. The light transmission layer 12 includes a material of a second refractive index. In some embodiments, the second refractive index may be greater than the first refractive index. The oxide layer 11 may include, for example, silicon dioxide ($SiO_2$), silicon oxide ($SiO_x$), another ceramic, other suitable materials, or a combination of two or more thereof.

Figure 2:
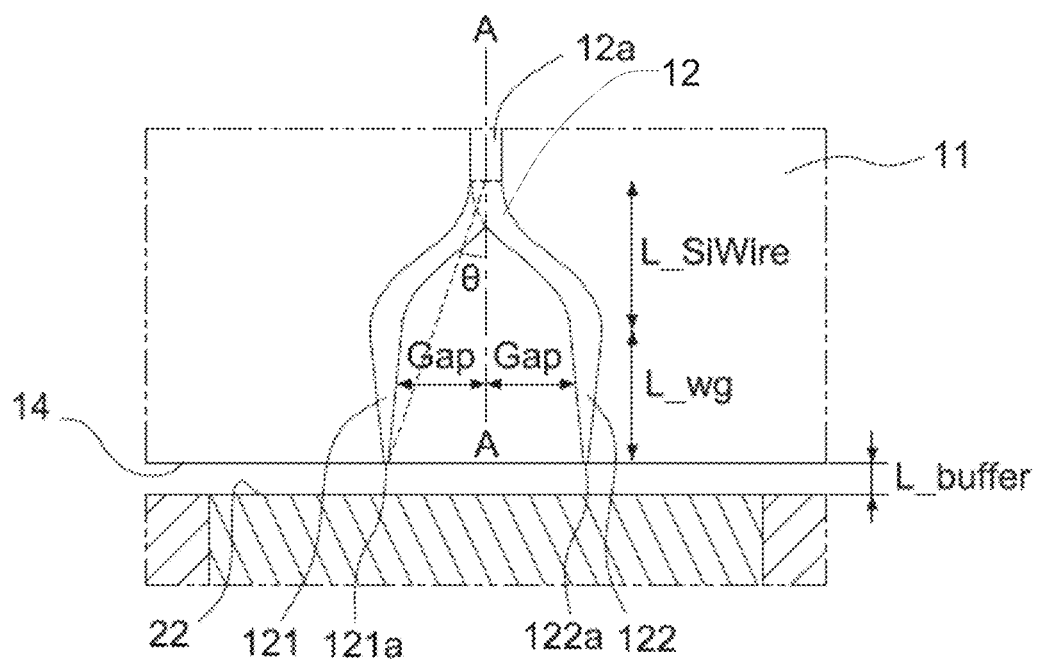
FIG. 2 illustrates a top view of an optical device package in accordance with some embodiments of the present disclosure.

FIG. 2 illustrates a top view of the optical device package 1 in accordance with some embodiments of the present disclosure. The light transmission layer 12 includes a main body 12a, a fork 121 and a fork 122. In some embodiments, the light transmission layer 12 may include a single fork, two forks, or more than two forks. The light transmission layer 12 may include, for example, silicon (Si), another semiconductor, other suitable materials, or a combination of two or more thereof. In some embodiments, the main body 12a may have a first substantially constant thickness. In some embodiments, the light transmission layer 12 may have the first substantially constant thickness of, e.g., from about 0.1 micrometer (μm) to 1 μm, from about 0.2 μm to 0.8 μm, or from about 0.3 μm to about 0.5 μm. The thickness may be measured along a direction orthogonal to a central axis (represented by a line A-A as shown in FIG. 2). In some embodiments, the light transmission layer 12 may have a lateral width of, e.g., from about 0.2 μm to 10 μm, from about 0.5 μm to 5 μm, or from about 1 μm to about 3 μm.

As shown in FIG. 2, the fork 121 is extended from the main body 12a. The fork 121 has a first tapering end 121a exposed by the oxide layer 11. The fork 122 is extended from the main body 12a. The fork 122 has a second tapering end 122a exposed by the oxide layer 11. The tapering ends may also be referred to as tips or tapers. Each of the first tapering end 121a and the second tapering end 122a may include a facet 14 for receiving light. In some embodiments, the lateral width of the facet 14 of at least one of the tapering ends 121a and 122a may be, e.g., less than about 0.05 μm, less than about 0.1 μm, less than about 0.2 μm, or less than about 0.5 μm.

In some embodiments, the width of at least one of the first tapering end 121a and the second tapering end 122a may be, e.g., less than about 0.05 μm, less than about 0.1 μm, less than about 0.2 μm, or less than about 0.5 μm. A lateral distance (e.g., twice of the Gap shown in FIG. 2) between the first tapering end 121a and the second tapering end 122a may be about 1 μm to 3 μm. The light beams may be received through the facet 14 and propagate in the forks 121a and 122a. At least some of the light beams propagating in the forks 121a and 122a may form a constructive interference in the main body 12a.

In some embodiments, the main body 12a and the forks 121 and 122 have the same first substantially constant thickness of, e.g., from about 0.1 μm to 1 μm, from about 0.2 μm to 0.8 μm, or from about 0.3 μm to about 0.5 μm. In some embodiments, the forks 121 and 122 may be disposed symmetrically. In some embodiments, the main body 12a has a central axis along a line A-A as shown in FIG. 2. An angle between the central axis and one of the first tapering end 121a and the second tapering end 122a may be, e.g., less than about 0.5 degree, less than about 1 degree, less than about 5 degrees, or less than about 10 degrees. The shape of the facets 14 of the tapering ends 121a and 122a may be, e.g., a rectangle, a square, a circle, etc. The lateral buffer distance (e.g., L_buffer shown in FIG. 2) between the surface 22 of the optical device 20 and the facets 14 may be, e.g., less than about 5 μm, less than about 10 μm, less than 25 μm, or less than about 50 μm.

Figure 3A:
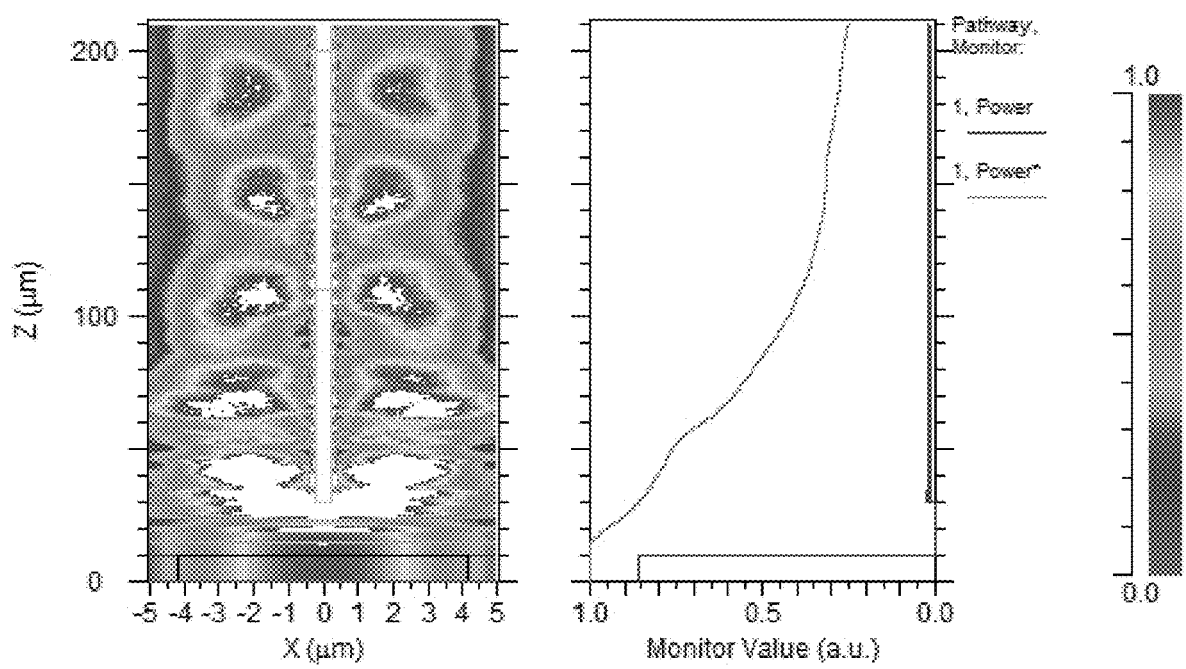
FIG. 3A illustrates simulation results in accordance with some embodiments of the present disclosure.
Figure 3B:
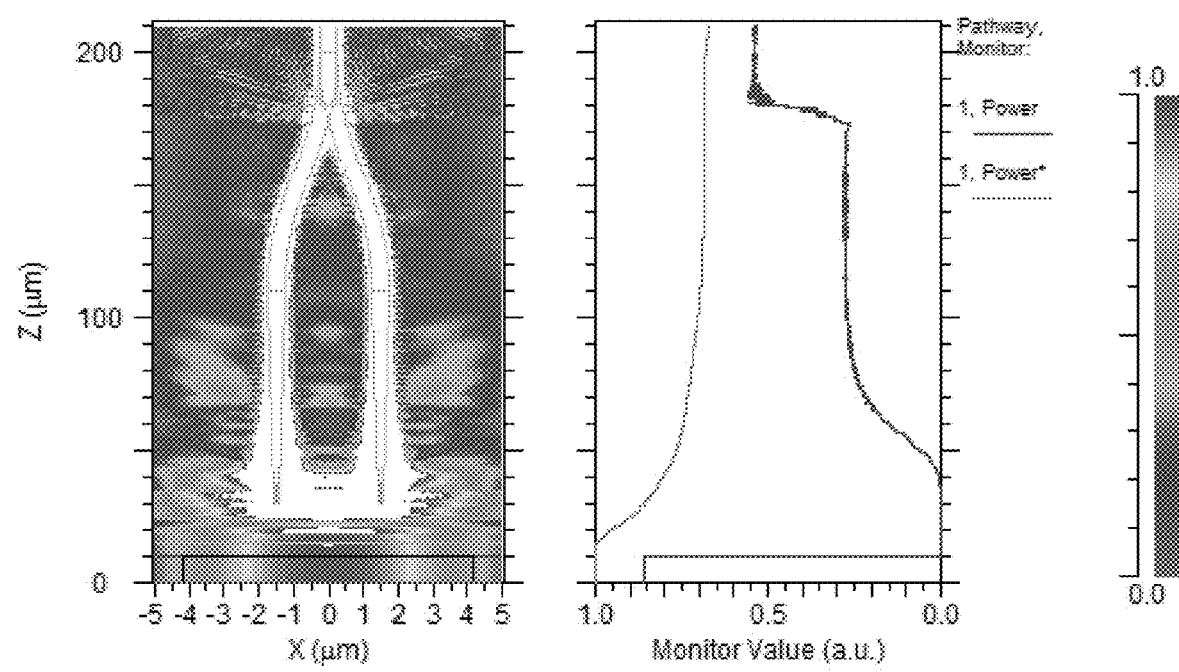
FIG. 3B illustrates simulation results in accordance with some embodiments of the present disclosure.

FIG. 3A and FIG. 3B illustrate simulation results in accordance with some embodiments of the present disclosure. In some embodiments, as shown in FIG. 3A, the waveguide 10 does not have a waveguide tip or a waveguide taper. The coupling efficiency (CE) between the waveguide 10 and the optical fiber 20 may be, e.g., about 1.4%, since most of the light energy is does not propagate in the waveguide 10. The mismatch between the sizes of the waveguide 10 and the optical fiber 20 lowers the CE. In some embodiments, even for the waveguide 10 having one waveguide tip or one waveguide taper, the CE between the waveguide 10 and the optical fiber 20 may be, e.g., about 42.3%. Still a large amount of light energy does not propagate in the waveguide 10.

Referring to FIG. 3B, the waveguide 10 has two waveguide tips or two waveguide tapers (e.g., the forks 121 and 122). The waveguide 10 having at least two forks may be referred to as fork-type waveguide. In some embodiments, the CE between the waveguide 10 and the optical fiber 20 may increase to, e.g., about 61.1%. Thus, the fork-type optical waveguide increases the optical coupling efficiency, because at least some of the light beams propagating in the forks 121 and 122 can form constructive interference in the main body 12a. In some embodiments, the forks 121 and 122 may also increase the tolerance of the horizontal offset between the waveguide 10 and the optical fiber 20.

Figure 4A:
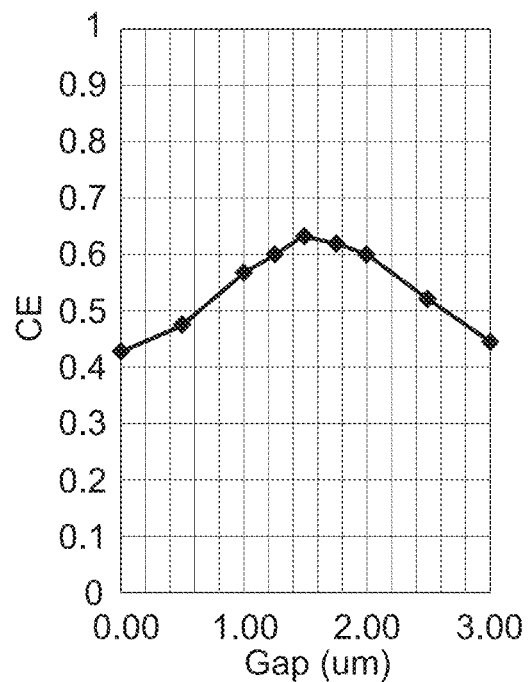
FIG. 4A illustrates simulation results in accordance with some embodiments of the present disclosure.
Figure 4B:
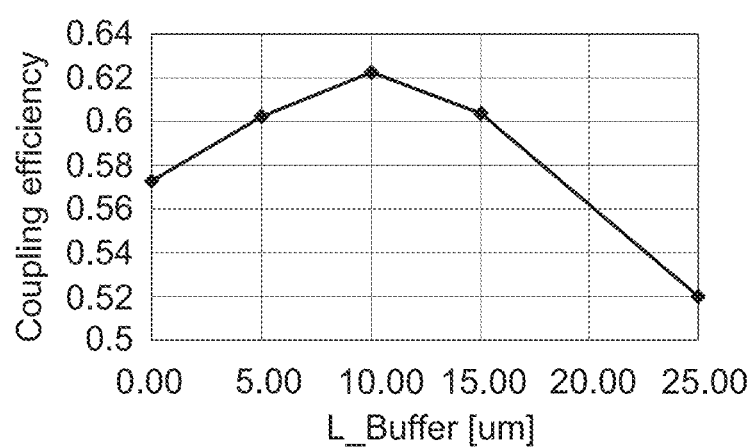
FIG. 4B illustrates simulation results in accordance with some embodiments of the present disclosure.
Figure 4C:
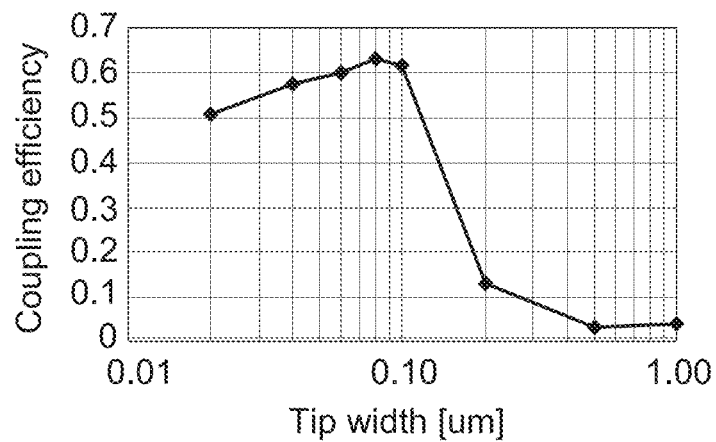
FIG. 4C illustrates simulation results in accordance with some embodiments of the present disclosure.

FIG. 4A, FIG. 4B and FIG. 4C illustrate simulation results in accordance with some embodiments of the present disclosure. In some embodiments, the lateral distance between the first tapering end 121a and the second tapering end 122a (shown in FIG. 2) may be about twice the value of Gap as shown in FIG. 4A. Referring to FIG. 4A, in some embodiments, an optimal range of the CE between the waveguide 10 and the optical fiber 20 may correspond to Gap value of, e.g., about 0.5 μm to about 2.5 μm, about 0.75 μm to about 2.25 μm, about 1 μm to about 2 μm, or about 1.25 μm to about 1.75 μm.

FIG. 4B illustrates the coupling efficiencies corresponding to various values of the lateral buffer distance between the surface 22 of the optical device 20 and the facets 14 (shown in FIG. 2 as L_buffer). In some embodiments, L_buffer may be, e.g., less than about 40 μm, less than about 30 μm, or less than about 25 μm. In some embodiments, when L_buffer is, e.g., less than about 5 μm, the waveguide 10 and the optical fiber 20 may be difficult to be aligned. In some embodiment, if L_buffer is between about 5 μm to about 25 μm, a proper alignment between the waveguide 10 and the optical fiber 20 may be achieved and a suitable, desired or optimal CE may be obtained. In some embodiments, an optimal CE between the waveguide 10 and the optical fiber 20 may correspond to an L_buffer value of, e.g., about 10 μm.

A lateral width of the facet 14 of one of the tapering ends 121a and 122a may be referred to as a Tip width. FIG. 4C illustrates the coupling efficiencies corresponding to various values of the lateral width of the facet 14. As shown in FIG. 4C, in some embodiments, an optimal CE between the waveguide 10 and the optical fiber 20 may correspond to a Tip width of, e.g., less than about 0.3 μm, less than about 0.2 μm, or less than about 0.1 μm.

Figure 5A:
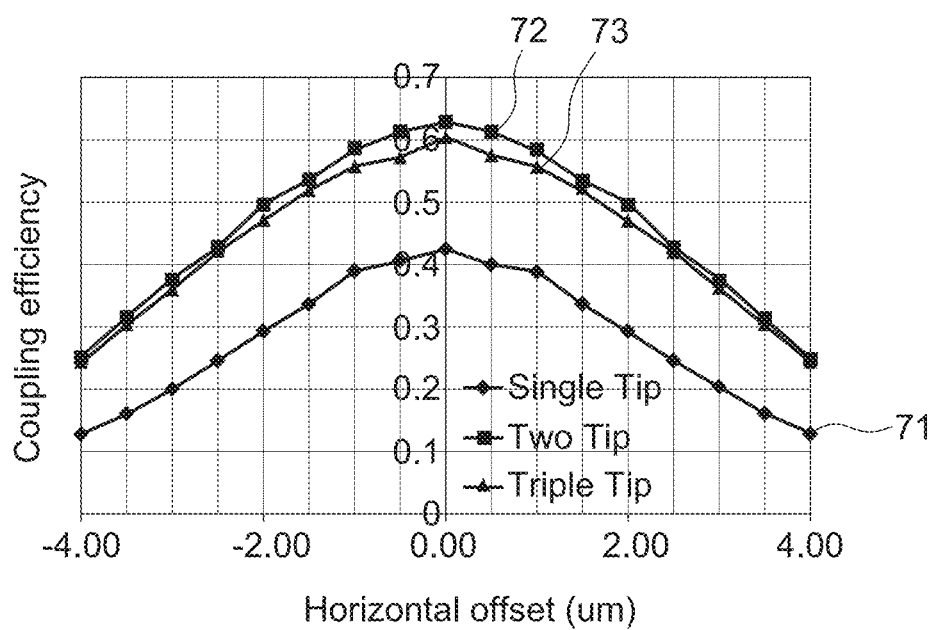
FIG. 5A illustrates simulation results in accordance with some embodiments of the present disclosure.
Figures 5B, 6:
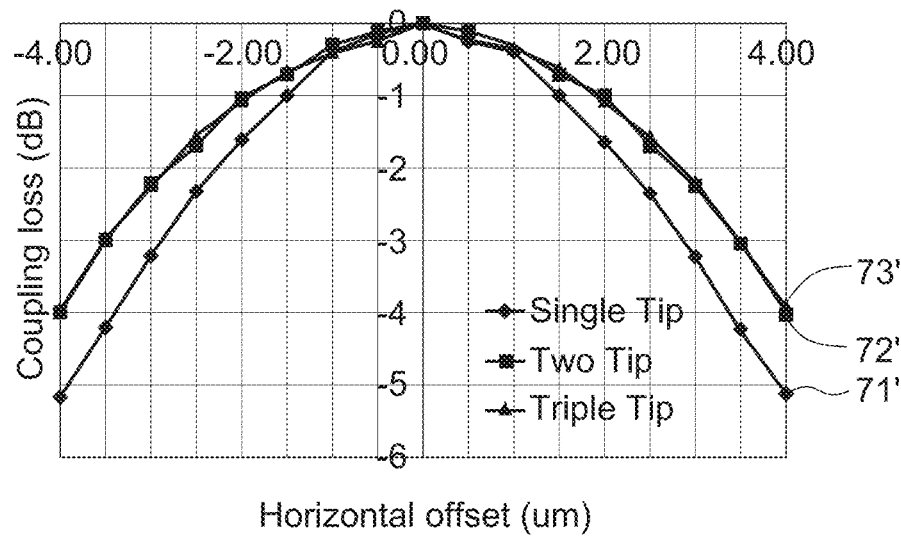
FIG. 5B illustrates simulation results in accordance with some embodiments of the present disclosure.
FIG. 6 illustrates simulation results in accordance with some embodiments of the present disclosure.

FIG. 5A and FIG. 5B illustrate simulation results in accordance with some embodiments of the present disclosure. Referring to FIG. 5A, a curve 71 corresponds to a waveguide having a single tip, a curve 72 corresponds to a waveguide having two tips, and a curve 73 corresponds to a waveguide having three tips (triple-tip waveguide). The X-axis of FIG. 5A corresponds to the horizontal offset between the waveguide 10 and the optical fiber 20. The Y-axis of FIG. 5A corresponds to the coupling efficiency. At least according to some embodiments illustrated in FIG. 5A, the waveguide having two tips (curve 72) may have a coupling efficiency that is higher than coupling efficiencies of the waveguide having a single tip (curve 71) and the waveguide having three tips (curve 73).

Referring to FIG. 5B, a curve 71' corresponds to a waveguide having a single tip, a curve 72' corresponds to a waveguide having two tips and a curve 73' corresponds to a waveguide having three tips (triple-tip waveguide). The X-axis of FIG. 5B corresponds to the horizontal offset between the waveguide 10 and the optical fiber 20. The Y-axis of FIG. 5B corresponds to the coupling loss. At least according to some embodiments illustrated in FIG. 5B, the waveguide having two tips (curve 72') may have a coupling loss that is lower than the coupling loses of the waveguide having a single tip (curve 71') and the waveguide having three tips (curve 73').

FIG. 6 illustrates simulation results in accordance with some embodiments of the present disclosure. In some embodiments, an angle θ shown in FIG. 6 corresponds to the angle θ shown in FIG. 2 between the central axis and one of the first tapering end 121a and the second tapering end 122a. As shown in FIG. 6, in some embodiments, an optimal CE between the waveguide 10 and the optical fiber 20 may correspond to an angle θ of, e.g., about 0.15 degree to about 0.8 degree, about 0.3 degree to about 0.7 degree, or about 0.45 degree to about 0.5 degree.

Figure 7:
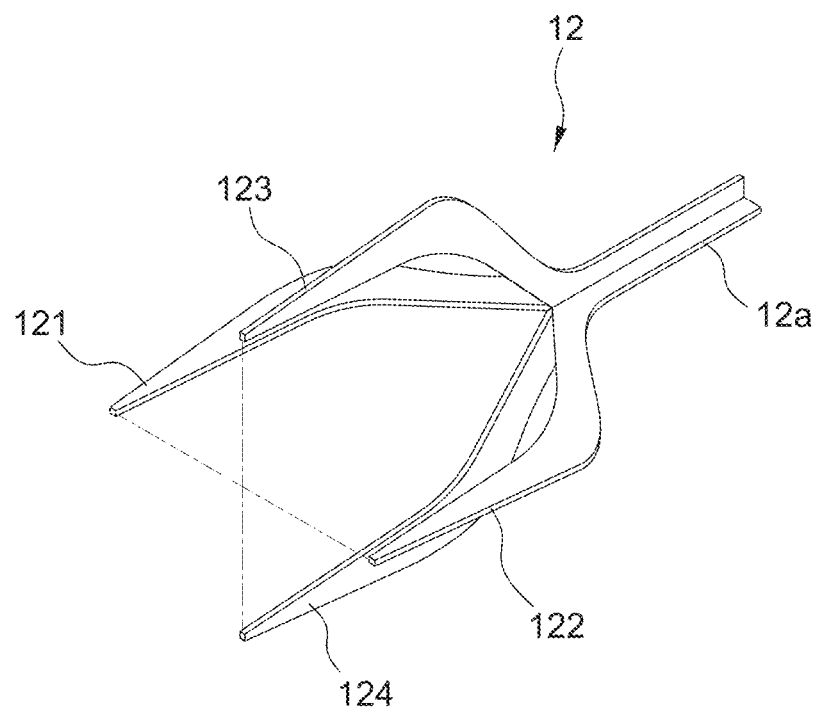
FIG. 7 illustrates a perspective view of an optical device in accordance with some embodiments of the present disclosure.

In some embodiments, a fork-type waveguide may include more than two forks. FIG. 7 illustrates a perspective view of an optical device in accordance with some embodiments of the present disclosure. The light transmission layer 12 includes a main body 12a, a fork 121, a fork 122, a fork 123 and a fork 124. The fork 121, the fork 122, the fork 123 and the fork 124 may be disposed symmetrically. In some embodiments, the light beams propagating in the fork 121, the fork 122, the fork 123 and the fork 124 may form constructive interference in the main body 12a. In some embodiments, the light transmission layer 12 may include the fork 121, the fork 122 and the fork 123, and may omit the fork 124 (not shown). The fork 121, the fork 122 and the fork 123 may be disposed symmetrically. In some embodiments, the light beams propagating in the fork 121, the fork 122 and the fork 123 may form constructive interference in the main body 12a.

Figure 8:
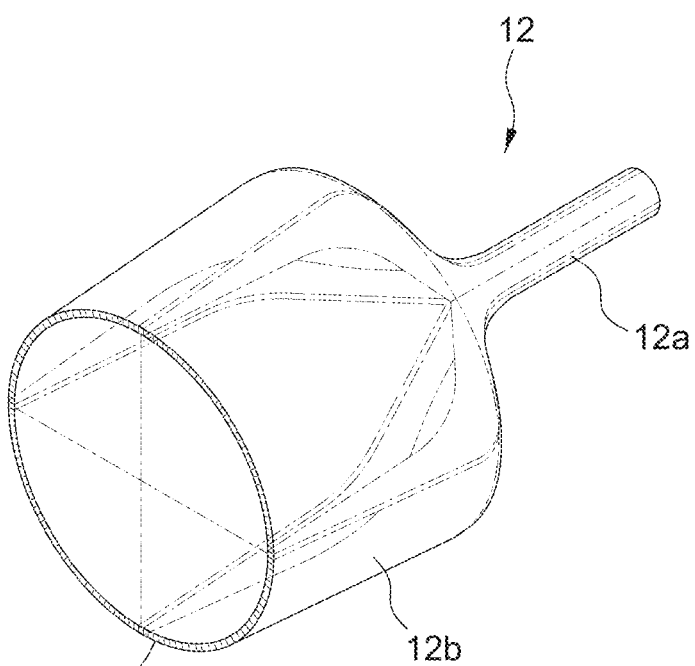
FIG. 8 illustrates a perspective view of an optical device in accordance with some embodiments of the present disclosure.

FIG. 8 illustrates a perspective view of an optical device in accordance with some embodiments of the present disclosure. The light transmission layer 12 includes a main body 12a and a cone-like (or funnel-shaped) extension portion 12b. The cone-like portion 12b has a circular-like end 14 extending around a circumference of the cone-like portion 12b, and the cone-like portion 12b tapers from the end 14 towards the main body 12a. The light beams propagating in the cone-like portion 12b may form the constructive interference in the main body 12a. In some embodiments, a lateral distance between the surface 22 of the optical fiber 20 (not shown) and the circular-like end 14 for receiving light may be, e.g., less than about 5 μm, less than about 10 μm, less than 25 μm, or less than about 50 μm.

As used herein, the terms "substantially," "approximately" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" or "approximately" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a parameter may be deemed to be "substantially" constant if a maximum deviation of a value of the parameter from an average value of the parameter is less than or equal to ±10% of the average value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optical device package, comprising:
   a waveguide, the waveguide comprising:
   a main body; and a plurality of forks, wherein each of the plurality of forks has a tapering end and is extended from the main body, and wherein each of the tapering ends of the forks comprises a facet for receiving light, the plurality of forks having a substantially constant thickness; and an optical fiber having a surface configured to output the light into the waveguide;

wherein a lateral distance between the surface of the optical fiber and at least one of the facets is less than about 25 micrometers ($\mu m$).

2. The optical device package of claim 1, wherein the forks are disposed symmetrically.

3. The optical device package of claim 1, wherein the main body has a central axis and an angle between the central axis and one of the facets is less than about 1 degree.

4. The optical device package of claim 1, wherein a width of at least one of the facets of the tapering ends is less than about 0.1 $\mu m$.

5. The optical device package of claim 1, wherein a lateral distance between at least two of the tapering ends is about 1 $\mu m$ to about 3 $\mu m$.

6. The optical device package of claim 1, wherein at least one of the facets of the tapering ends has a shape of a rectangle.

7. The optical device package of claim 1, wherein the forks are disposed symmetrically, the main body has a first thickness, each of the forks has a second thickness, and the first thickness is substantially the same as the second thickness.

8. The optical device package of claim 1, wherein the forks comprise at least a first fork, a second fork and a third fork, wherein the first, second and third forks are configured to propagate light beams that form constructive interference in the main body.

9. The optical device package of claim 1, wherein the forks comprise at least a first fork, a second fork, a third fork and a fourth fork, wherein the first, second, third and fourth forks are configured to propagate light beams that form constructive interference in the main body.

10. An optical device, comprising:
a waveguide, the waveguide comprising:
a main body; and
a plurality of forks extended from the main body, each fork including a tapering end, wherein each of the tapering ends of the forks comprises a facet for receiving light, wherein the forks are configured to propagate light beams that form constructive interference in the main body, the plurality of forks having a substantially constant thickness; and
an optical fiber having a surface configured to output the light into the waveguide;
wherein a lateral distance between the surface of the optical fiber and at least one of the facets is less than about 25 $\mu m$.

11. The optical device of claim 10, wherein the forks are disposed symmetrically.

12. The optical device of claim 10, wherein the main body has a central axis and an angle between the central axis and one of the facets is less than about 1 degree.

13. The optical device of claim 10, wherein a width of at least one of the facets of the tapering ends is less than about 0.1 $\mu m$.

14. The optical device of claim 10, wherein a lateral distance between at least two of the tapering ends is about 1 $\mu m$ to about 3 $\mu m$.

15. The optical device of claim 10, wherein at least one of the facets of the tapering ends has a shape of a rectangle.

16. The optical device of claim 10, wherein the forks are disposed symmetrically, the main body has a first thickness, each of the forks has a second thickness, and the first thickness is substantially the same as the second thickness.

17. The optical device of claim 10, wherein the forks comprise at least a first fork, a second fork, a third fork and a fourth fork, wherein the first, second, third and fourth forks are disposed symmetrically.

* * * * *